UNITED STATES PATENT OFFICE.

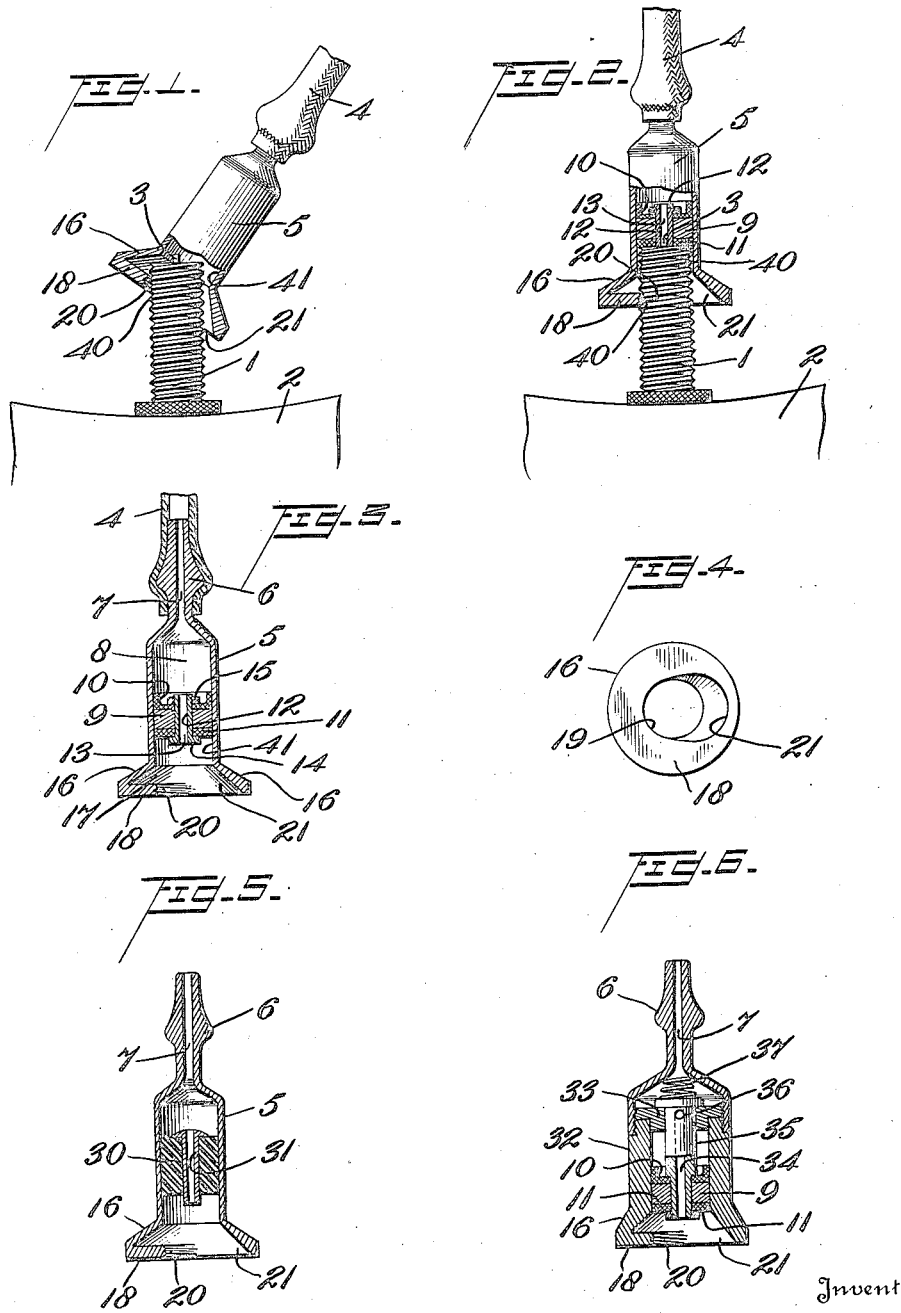

NORMAN S. McEWEN, OF NASHVILLE, TENNESSEE.

COUPLING FOR PNEUMATIC TIRES.

1,213,518. Specification of Letters Patent. Patented Jan. 23, 1917.

Application filed September 18, 1916. Serial No. 120,832.

*To all whom it may concern:*

Be it known that I, NORMAN S. MCEWEN, a citizen of the United States, residing at Nashville, in the county of Davidson and State of Tennessee, have invented certain new and useful Improvements in Couplings for Pneumatic Tires; and I do hereby declare the following to be a full, clear, and exact description of the invention, such as will enable others skilled in the art to which it appertains to make and use the same.

This invention relates to automatic couplings for automobile tire pump connections, and has for its object to provide a coupling of this nature which will be simple in construction, efficient in action, comparatively inexpensive to manufacture, and more easily attached and detached than those heretofore proposed.

With these and other objects in view the invention consists in the novel details of construction and combinations of parts more fully hereinafter disclosed and particularly pointed out in the claims.

Referring to the accompanying drawings, forming a part of this specification, in which like numerals designate like parts in all the views:—Figure 1 is a diagrammatic partly sectional view of a coupling made in accordance with this invention, and showing the parts about to be engaged; Fig. 2 is a view similar to Fig. 1 showing the parts fully engaged; Fig. 3 is a sectional view of the coupling detached from the nipple carried by the wheel rim; Fig. 4 is a bottom plan view of the lower end of the coupling shown in Fig. 3; Fig. 5 is a sectional view of a modified form of coupling; and Fig. 6 is a sectional view of a still further modified form of the coupling.

1 indicates the usual nipple carried by the wheel rim 2, and provided with the valve stem 3.

4 indicates any suitable hose or other connection to an air pump or reservoir of compressed air, not shown, and 5 indicates a coupling member provided at one end with the reduced end portion 6 fitting the hose 4, and having the passage 7 leading to the chamber 8 in which fits the piston 9 having the cup shaped packing 10 and the disk like packing 11. The said piston 9 is provided with the tubular member 12 having the passage 13 passing through said packings 10 and 11, and said member 12 is further provided at one end with the flange 14, and at its other end with the nut 15 to secure it in place. The other end 16 of the coupling member 5 is flared as shown to produce the chamber 17, partially closed by the wall 18 having the semi-circular opening 19 partially screw threaded as at 20. Said wall 18 is further provided with the enlarged semi-elliptical opening or cut away portion 21, joined to the opening 19 and not provided with screw threads. The two openings 19 and 21 thus constitute a single elongated opening having screw threads at one end, all as will be clear from Figs. 3 and 4.

In the modified form of the invention shown in Fig. 5, the construction is the same as that just disclosed except a plug piston 30 of rubber, or other yielding material is provided, and a modified form of tubular member 31 is employed.

The still further modified form of the invention shown in Fig. 6, is especially adapted for use in connection with compressed air reservoirs. In this form of the invention, the construction of piston illustrated in Fig. 5 is employed, but the coupling member 32 has the reduced coupling end 6 screw threaded thereto, and is provided with the perforated plug 33 through which passes the central tubular member 35 provided with the bore 34 communicating with the passage 7 by means of the port 36. Said member 35 moves up and down under the control of the spring 37, and therefore always returns to the position shown in Fig. 6 so as to maintain the port 36 closed.

In operation when it is desired to inflate an automobile, or other tire, the coupling member such as 5 is brought to the nipple 1 as indicated in Fig. 1, and the valve stem 3 made to engage the bore or passage 13 in the central tubular member 12. The semi-elliptical opening 21 greatly facilitates the operation, for one side or end of the opening 21 terminates flush with a portion of the flared walls of the chamber 17, and therefore the end of the screw threaded nipple 1 is readily guided to such a position that the valve stem 3 of necessity finds the passage 13 in the piston 9. The chamber wall 18 being screw threaded as at 20, said edge is readily made to catch into the screw threads 40 of the nipple 1 as soon as the operator feels the valve stem 3 has entered said passage 13, as will be clear from the drawings. Pressure is now exerted and the parts are straightened up into the position shown in Fig. 2, whereupon the screw threads 40 on one side of the nipple 1 readily snap into the screw threads 20 of the semi-circular opening 19, and the said screw threads 40 on the other side of the nipple 1 readily take against the inner cylindrical wall 41 of the coupling 5 to hold the parts in their operative relations. In order that the parts may be firmly held in place, the said inner cylindrical wall 41 or bore of the coupling 5 is preferably made of such a diameter as to loosely fit the screw threaded nipple 1 as indicated. Air pressure is next applied through the pump or air reservoir not shown, whereupon the valve stem 3 is forced downward or caused to open the valve, not shown, while piston is likewise moved and the packing 11 is caused to press upon the end of the nipple 1 thus insuring a tight joint, and still further aiding in holding the parts in place. After the tire has been pumped up to the desired pressure, the coupling is readily detached from the nipple 1 by turning it from the position shown in Fig. 2 into the position shown in Fig. 1.

The operation of the parts shown in Fig. 6 is the same as that of the well known automatic connection now employed where stationary reservoirs of compressed air are available, but the above improvements comprising the opening 21 and screw threads 20 facilitate the ready coupling of the parts. That is to say, the threads 40 of the nipple 1, are engaged with the threads 20 and with the wall or bore of the coupling member 32, in the manner just disclosed, whereupon the port 36 being unsealed by reason of the central tubular member 35 being moved against the compression of the spring 37, the passage 7 communicating with said stationary reservoir, not shown, is brought into communication with the bore 34 of the central member 35, and said bore then communicates through the nipple 1 with the interior of the tire after the valve stem 3 is depressed, all in a manner well known.

It will now be clear that in all of the forms of the invention, I provide a movable piston having a passage such as 13, 31 or 34, and said movable piston is adapted on one side to contact with the exposed end of the nipple 1, to make a tight joint. It will further be seen that since the pressure on the other side of said piston is greater than the pressure passing into the tire, the said piston not only makes a tight joint, but aids in firmly holding the parts in their operative positions against said nipple while the tire is being inflated. Further it will be clear that owing to the particular construction of the piston 9 this coupling is especially adapted to make water tight connections as well as air tight connections, and therefore it is capable of general use for joining water hose to sources of water supplies. In fact, it could be used for steam or fluids in general.

It is obvious that those skilled in the art may vary the details of construction as well as the arrangement of parts without departing from the spirit of the invention, and therefore, I do not wish to be limited to the above disclosure except as may be required by the claims.

What I claim is:—

1. In a coupling for inflating pneumatic tires the combination of means adapted to be connected to a supply of compressed air; a coupling member joined at one end to said means and having its other end flared to provide an inclined wall and an elongated opening, said opening terminating at one side flush with a portion of said inclined wall and having its opposite side screw threaded; and a piston provided with a passage therethrough movable in said coupling member, substantially as described.

2. In a coupling for inflating tires the combination of a screw threaded nipple carried by the wheel rim; a coupling member having a flared interior chamber adapted to loosely fit said nipple and provided with an elongated opening having one end flush with the wall of said flared chamber and its other end screw threaded and adapted to engage the screw threads on said nipple; and a movable piston carried by said coupling member adapted to engage said nipple, substantially as described.

3. In a coupling of the class described, the combination of a screw threaded nipple provided with a valve stem; a coupling member provided with a flared bore adapted to loosely fit said nipple and with an elongated opening enlarged and flush with said bore at one end and having screw threads at its other end, said last named screw threads adapted to engage the screw threads on said nipple; and a piston having a passage adapted to receive said valve stem, located in said bore, substantially as described.

4. In a coupling of the class described, the combination of a screw threaded nipple provided with a valve stem; a coupling member provided with a flared bore adapted to loosely fit said nipple and with an elongated opening enlarged and flushed with said bore at one end and having screw threads at its other end, said last named screw threads adapted to engage the screw threads on said nipple; and a piston provided on one side with a cup shaped packing to form a tight joint, on its other side with disk like packing to engage the end of the nipple, and having a passage adapted to receive said valve stem, said piston movable up and down and located in said bore, substantially as described.

In testimony whereof I affix my signature, in presence of two witnesses.

NORMAN S. McEWEN.

Witnesses:
DOROTHY JONES,
THEO. W. PIERSON.